United States Patent Office

3,017,443
Patented Jan. 16, 1962

---

3,017,443
METHOD OF INCORPORATING A MIXTURE OF 2,6-DIALKOXY-4-ALKYLPHENOL AND 2,2′-ALKYLENE-BIS-(4,6-DIALKYLPHENOL) IN RUBBER, AND RESULTING PRODUCT
Joseph A. Chenicek, Prairie View, and William L. Cox, Mount Prospect, Ill., assignors, by mesne assignments, to Universal Oil Products Company, Des Plaines, Ill., a corporation of Delaware
No Drawing. Filed Dec. 30, 1957, Ser. No. 705,789
6 Claims. (Cl. 260—810)

This application is a continuation-in-part of our co-pending application Serial No. 556,033, filed December 29, 1955, now Patent No. 2,888,503, and relates to a novel method of retarding cracking of rubber due to ozone.

It now has been definitely established that deterioration of rubber in storage, transportation or during use is caused by ozone and by oxygen and that the deterioration caused by ozone is different from the deterioration caused by oxygen. Cracking due to ozone is a surface reaction and the reaction products are ozonides. On the other hand, oxidative deterioration is not limited to only the surface but occurs throughout the rubber and the reaction products are hydroperoxides. It appears that the presence of ozone in the atmosphere is increasing and deterioration of rubber due to ozone is becoming more and more of a serious problem.

Because the deterioration caused by oxygen is so different from the deterioration caused by ozone, antioxidants previously used in rubber are not effective as antizonants. For example, 2,2′-methylene-bis-(4-methyl-6-tert-butylphenol) is an effective antioxidant in rubber but possesses no potency as an antiozonant to prevent cracking due to ozone.

It recently has been found that 2,6-dialkoxy-4-alkylphenols are effective antiozonants in rubber and will not discolor the rubber. Accordingly, these antiozonants are particularly suitable for use in white or light-colored rubber or in dark rubber which adjoins the white or light-colored rubber. While these inhibitors are effective as antiozonants, it now has been found that a synergistic effect is obtained by using both a 2,6-dialkoxy-4-alkylphenol and 2,2′-methylene-bias-(4-methyl-6-tert-butylphenol). This discovery is surprising because, as hereinbefore set forth, 2,2′-methylene-bias-(4-methyl-6-tert-butylphenol) by itself possesses no antiozonant properties, and it certainly would not be expected that such a compound would have a synergistic effect to increase the antiozonant properties of the 2,6-dialkoxy-4-alkylphenols.

The present invention is particularly applicable for use in the stabilization of natural rubber. Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the present invention is particularly applicable for use in light-colored natural rubber and dark-colored rubber associated therewith, it is understood that the present invention may be used for stabilization of other dark-colored natural rubber. Similarly, the present invention may be utilized for preventing ozone cracking in synthetic rubber. Much of the synthetic rubber now being produced commercially is known in the art as SBR rubber and is a copolymer of butadiene and styrene. Other synthetic rubbers include those produced from butadiene and acrylonitrile (Buna-N, NBR), isoprene and isobutylene (butyl rubber, IIR), etc. Still other synthetic rubbers include Thiokol rubber, silicone rubber, neoprene rubber, etc.

In one embodiment the present invention relates to a novel method of preventing the cracking of rubber due to ozone which comprises incorporating therein an antiozonative concentration of a synergistic mixture of a 2,6-dialkoxy-4-alkylphenol and a 2,2′-alkylene-bis-(4,6-dialkylphenol).

In a specific embodiment the present invention relates to a method of preventing the cracking of light-colored natural rubber due to ozone and also avoiding staining thereof, which comprises incorporating in said rubber from about 0.25% to about 5% by weight of a synergistic antiozonant composition comprising 2,6-dimethoxy-4-methylphenol and 2,2′-methylene-bis-(4-methyl-6-tert-butylphenol).

Any suitable 2,6-dialkoxy-4-alkylphenol may be employed in accordance with the present invention. Preferably, each of the alkoxy groups are the same and each contains from 1 to about 12 carbon atoms, and still more preferably each contains from 1 to about 4 carbon atoms and thus are selected from methoxy, ethoxy, propoxy and butoxy. However, in some cases, the alkoxy groups may be different from each other. Also, it is preferred that the alkyl group in the 4-position contains not more than about 12 carbon atoms, and still more particularly not more than about 4 carbon atoms, and thus is selected from methyl, ethyl, propyl and butyl.

The preferred antioxidant of the present invention comprises 2,6-dimethoxy-4-propylphenol. Other antiozidants include 2,6-dimethoxy-4-methylphenol, 2,6-dimethoxy-4-butylphenol, 2,6-dimethoxy-4-amylphenol, 2,6-dimethoxy-4-hexylphenol, 2,6-dimethoxy-4-heptylphenol, 2-6-dimethoxy-4-octylphenol, 2,6-dimethoxy-4-nonylphenol, 2,6-dimethoxy-4-decylphenol, 2,6-dimethoxy-4-undecylphenol, 2,6-dimethoxy-4-dodecylphenol, etc., 2,6-diethoxy-4-methylphenol, 2,6-diethoxy-4-ethylphenol, 2,6-diethoxy-4-propylphenol, 2,6-diethoxy-4-butylphenol, 2,6-diethoxy-4-amylphenol, 2,6-diethoxy-4-hexylphenol, 2,6-diethoxy-4-heptylphenol, 2,6-diethoxy-4-octylphenol, 2,6-diethoxy-4-nonylphenol, 2,6-diethoxy-4-decylphenol, 2,6-diethoxy-4-undecylphenol, 2,6-diethoxy-4-dodecylphenol, etc., 2,6-dipropoxy-4-methylphenol, 2,6-dipropoxy-4-ethylphenol, 2,6-dipropoxy-4-propylphenol, 2,6-dipropoxy-4-butylphenol, 2,6-dipropoxy-4-amylphenol, 2,6-dipropoxy-4-hexylphenol, 2,6-dipropoxy-4-heptylphenol, 2,6-dipropoxy-4-octylphenol, 2,6-dipropoxy-4-nonylphenol, 2,6-dipropoxy-4-decylphenol, 2,6-dipropoxy-4-undecylphenol, 2,6-dipropoxy-4-dodecylphenol, etc., 2,6-dibutoxy-4-methylphenol, 2,6-dibutoxy-4-ethylphenol, 2,6-dibutoxy-4-propylphenol, 2,6-dibutoxy-4-butylphenol, 2,6-dibutoxy-4-amylphenol, 2,6-dibutoxy-4-hexylphenol, 2,6-dibutoxy-4-heptylphenol, 2,6-dibutoxy-4-octylphenol, 2,6-dibutoxy-4-nonylphenol, 2,6-dibutoxy-4-decylphenol, 2,6-dibutoxy-4-undecylphenol, 2,6-dibutoxy-4-dodecylphenol, etc.

In general, it is preferred that the alkyl group in the 4-position is an n-alkyl substituent. Thus, a preferred antiozonant comprises 2,6-dimethoxy-4-n-propylphenol. However, in some cases the alkyl group may be of secondary or tertiary configuration but not necessarily with equivalent results. Generally, it is preferred that the alkyl portion of the alkoxy radicals is of straight chain, although in some cases it may be of branched chain. Preferably these compounds are symmetrical; that is, both of the alkoxy groups are of the same chain length and configuration, although in some cases the alkoxy groups may be different. It is understood that the various alternative compounds which may be used as a component of the antiozonant mixture of the present invention are not necessarily equivalent.

Hardwood tar distillate contains 2,6-dialkoxy-4-alkylphenols and, when desired, the 2,6-dialkoxy-4-alkylphenols for use in the present invention may be recovered from the wood tar distillate in any suitable manner. The product recovered from the wood tar distillate also may contain other fractions which will not be harmful for use in rubber and, in one embodiment of the invention, the fraction of wood tar distillate so recovered may be used. In another embodiment, the 2,6-dialkoxy-4-alkylphenol may be synthetically prepared in any well known manner.

As hereinbefore set forth, 2,2'-methylene-bis-(4-methyl-6-tert-butylphenol), while not possessing antiozonant properties by itself, exhibits a surprising synergistic effect when used with a 2,6-dialkoxy-4-alkylphenol. 2,2'-methylene-bis-(4-methyl-6-tert-butylphenol) may be purchased in the open market or it may be synthetically prepared in any suitable manner. While 2,2'-methylene-bis-(4-methyl-6-tert-butylphenol) is preferred, it is understood that other suitable 2,2'-alkylene-bis-(4-6-dialkylphenols) may be employed. Illustrative compounds include 2,2'-ethylene-bis-(4-methyl-6-tert-butylphenol), 2,2'-propylene-bis-(4-methyl-6-tert-butylphenol), 2,2'-butylene-bis-(4-methyl-6-tert-butylphenol), etc., 2,2'-methylene-bis-(4-methyl-6-tert-amylphenol), 2,2'-ethylene-bis-(4 methyl - 6 - tert - amylphenol), 2,2' - propylene - bis - (4-methyl-6-tert-amylphenol), 2,2'-butylene-bis-4-methyl-6-tert-amylphenol), etc., 2,2'-methylene-bis-(4-ethyl-6-tert-butylphenol), 2,2' - ethylene-bis-(4-ethyl-6-tert-butylphenol), 2,2'-propylene-bis-(4-ethyl-6-tert-butylphenol), etc., 2,2'-methylene-bis-(4-ethyl-6-tert-amylphenol), 2,2'-ethylene-bis-(4-ethyl-6-tert-amylphenol), 2,2'-propylene-bis-(4-ethyl-6-tert-amylphenol), 2,2'-butylene-bis-(4-ethyl-6-tert-amylphenol), etc.

The concentration of the antiozonant composition will be selected to give the desired protection against ozone cracking. In general, the antiozonant composition will be used in a concentration of from about 0.25% to about 10% by weight of the rubber hydrocarbon and preferably in a concentration of from about 2% to about 5% by weight thereof. These concentrations are based on the rubber hydrocarbon exclusive of the other components of the final rubber composition and are used in this manner in the present specification and claims. The proportions of the components of the antiozonant composition generally will be within the range of from about 1 to about 10 parts by weight of the 2,6-dialkoxy-4-alkyl-phenol per 1 part by weight of the 2,2'-alkylene-bis-(4,6-dialkylphenol). Because 2,2'-methylene-bis-(4-methyl-6-tert-butylphenol) also functions as an antioxidant, it may be used in a larger concentration than is required solely for the synergistic effect exhibited with the 2,6-dialkoxy-4-alkylphenol.

The antiozonant composition of the present invention is used in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozonant composition of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

It is understood that the antiozonant composition of the present invention is utilizable along with other additives incorporated in rubber for specific purposes including, for example, accelerators, softeners, extenders, reinforcing agents, etc.

As hereinbefore set forth and as another feature of the present invention, 2,2' - methylene-bis-(4-methyl-6-tert-butylphenol) serves the dual function of acting as a synergist to increase the antiozonant properties of the mixture and also serves as an antioxidant. However, when desired, the antiozonant composition of the present invention also may be used along with one or more additional antioxidants. Any suitable antioxidant may be employed including, for example, phenyl-beta-naphthylamine, 6 - phenyl - 2,2,4 - trimethyl-1,2-dihydroquinoline, marketed under the trade name of "Santo-flex-B," 2,6-di-tert-butyl-p-cresol, the reaction production of acetone and diphenylamine, marketed under the trade name of "B.L.E.," etc. These antioxidants generally are used in a concentration of from about 0.1% to about 1% by weight of the rubber, although higher concentrations may be used in some cases. However, the concentration of additional antioxidant can be decreased by the amount of 2,2'-methylene-bis-(4-methyl-6-tert-butylphenol) incorporated in the rubber for the purposes hereinbefore set forth.

The antiozonant composition of the present invention is incorporated in rubber or rubbery products in any suitable manner and at any suitable stage of preparation. When the antiozonant composition is added to a liquid such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

EXAMPLE I

The data reported in this example were obtained with white rubber of the following recipe.

Table I

| Components: | Parts by weight |
|---|---|
| Pale crepe | 100 |
| Stearic acid | 2 |
| Ultramarine blue | 0.2 |
| Sulfur | 2.5 |
| Benzothiazyl disulfide | 0.75 |
| Titanium oxide | 30 |
| Zinc oxide | 65 |

The rubber was cured and milled in a conventional manner and cut into strips which were evaluated in a dynamic test. In this test the strips of rubber were subjected to 320 flexes per minute of from zero to 20% elongation in an ozone cabinet at a temperature of 72° F. and in the presence of 25 parts of ozone per 100 million parts of air. The test was conducted for 6 hours and, after that time, the samples of rubber were evaluated visually.

Different samples of the rubber containing 1, 2, 3 and 4 parts, respectively, of 2,2'-methylene-bis-(4-methyl-6-tert-butylphenol) underwent considerable cracking after exposure in the ozone cabinet in the manner described above. The complete surface of the rubber was covered with fine cracks. As hereinbefore set forth, 2,2'-methylene-bis-(4-methyl-6-tert-butylphenol) is not an antiozonant and therefore did not serve to prevent cracking due to ozone.

The 2,6-dialkoxy-4-alkylphenol antiozonant used in this example is a concentrate recovered from hardwood tar distillate and comprised principally 2,6-dimethoxy-4-methylphenol and 2,6-dimethoxy-4-n-propylphenol. Different samples of the rubber described above were prepared to contain 1, 2 and 3 parts by weight, respectively, of this concentrate. When evaluated in the ozone cabinet in the manner described above, the samples of rubber underwent considerably less cracking than the samples of rubber containing only 2,2'-methylene-bis-(4-methyl-6-tert-butylphenol). However, slight edge cracks were visible in these samples of the rubber. The number of cracks appear to be inversely proportional to the concentration of the antiozonant.

In the following runs both the concentrate and 2,2'-methylene-bis-(4-methyl-6-tert-butylphenol) were incorporated in different samples of the rubber described above. These samples were prepared to contain 1 part by weight of 2,2'-methylene-bis-(4-methyl-6-tert-butylphenol) and 1, 2 and 3 parts by weight, respectively, of the concentrate. These samples were evaluated in the ozone cabinet in the manner described above. All three samples were substantially free from cracks. From the above data, it is seen that the use of both 2,6-dialkoxy-4-alkylphenol and 2,2'-methylene-bis-(4-methyl-6-tert-butylphenol) results in a synergistic effect and retarded cracking of the rubber to an extent greater than obtained with either of these components alone.

EXAMPLE II

In order to decrease the cost of rubber formulations, consideration has been given to reducing the concentration of zinc oxide in the rubber and to replace it with less expensive calcium carbonate. Another formulation was prepared using the recipe described in Example I except that only 5 parts of zinc oxide and 30 parts of calcium carbonate were used instead of 65 parts of zinc oxide.

Samples of this rubber were prepared, cut into strips, and evaluated in the same manner as described in Example I. Here again, the sample of rubber containing only 2,2'-methylene-bis-(4-methyl-6-tert-butylphenol) underwent considerable cracking when evaluated in the manner described in Example I. The complete surface of the rubber sample was covered with fine cracks. On the other hand, samples containing 1, 2 and 3 parts, respectively, of the concentrate, in addition to 1 part by weight of 2,2'-methylene-bis-(4-methyl-6-tert-butylphenol) were substantially free from cracks after evaluation in the manner described in Example I.

The above data further confirmed the synergistic effect obtained through the use of both the 2,6-dialkoxy-4-alkylphenol and 2,2'-methylene-bis-(4-methyl-6-tert-butylphenol).

We claim as our invention:

1. The method of preventing the cracking of natural rubber due to ozone which comprises incorporating therein from about 0.25% to about 10% by weight of a synergistic mixture of from about 1 to about 10 parts of 2,6-dialkoxy-4-alkylphenol and 1 part of 2,2'-alkylene-bis-(4,6-dialkylphenol).

2. The method of preventing the cracking of natural rubber due to ozone which comprises incorporating therein from about 0.25% to about 10% by weight of a synergistic mixture of from about 1 to about 10 parts of 2,6-dimethoxy-4-methylphenol and 1 part of 2,2'-methylene-bis-(4-methyl-6-tert-butylphenol).

3. The method of preventing the cracking of natural rubber due to ozone which comprises incorporating therein from about 0.25% to about 10% by weight of a synergistic mixture of from about 1 to about 10 parts of 2,6-dimethoxy-4-n-propylphenol and 1 part of 2,2'-methylene-bis-(4-methyl-6-tert-butylphenol).

4. Natural rubber normally subject to cracking by the action of ozone containing from about 0.25% to about 10% by weight of a synergistic mixture of from about 1 to about 10 parts of 2,6-dialkoxy-4-alkylphenol and 1 part of 2,2'-alkylene-bis-(4,6-dialkylphenol).

5. Light-colored natural rubber normally subject to cracking by the action of ozone containing from about 0.25% to about 10% by weight of a synergistic mixture of from about 1 to about 10 parts of 2,6-dimethoxy-4-n-propyl-phenol and 1 part of 2,2'-methylene-bis-(4-methyl-6-tert-butylphenol).

6. Light-colored natural rubber normally subject to cracking by the action of ozone containing from about 0.25% to about 10% by weight of a synergistic mixture of from about 1 to about 10 parts of 2,6-dimethoxy-4-methylphenol and 1 part of 2,2'-methylene-bis-(4-methyl-6-tert-butylphenol).

References Cited in the file of this patent

UNITED STATES PATENTS

| | | |
|---|---|---|
| 2,538,355 | Davis et al. | Jan. 16, 1951 |
| 2,591,651 | Young | Apr. 1, 1952 |
| 2,679,459 | Rosenwald | May 25, 1954 |
| 2,888,503 | Chenicek et al. | May 26, 1959 |